May 28, 1935.  H. G. WEBSTER  2,002,805
POLYMERIZATION OF NICKEL CARBONYL
Filed March 21, 1933
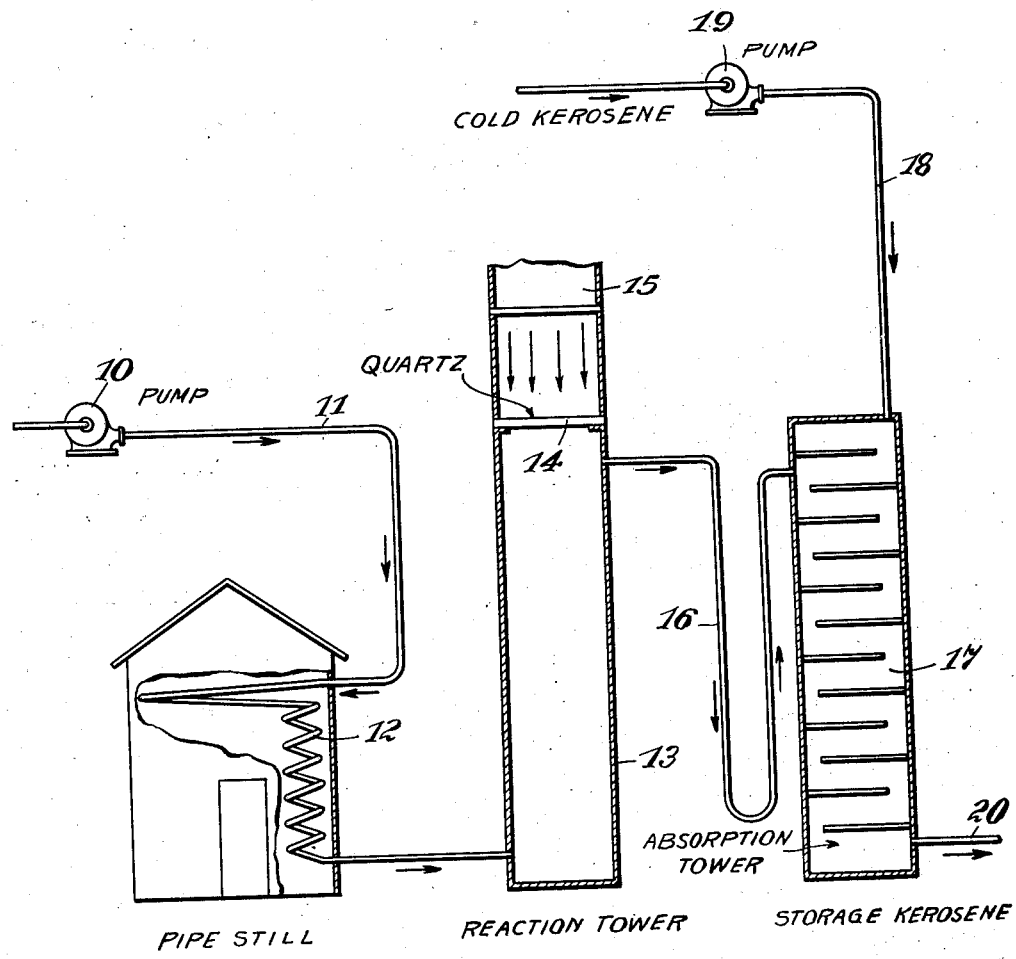

Patented May 28, 1935

2,002,805

UNITED STATES PATENT OFFICE 2,002,805

POLYMERIZATION OF NICKEL CARBONYL

Hugh Graham Webster, London, Ontario, Canada, assignor of one-half to John W. G. Winnett, London, Ontario, Canada Application March 21, 1933, Serial No. 661,902

14 Claims. (Cl. 23—5)

This invention relates to a method of polymerizing nickel carbonyl to form higher molecular compounds.

In the manufacture of gasoline and like fuels, many brands of material are offered in order to produce a higher rate of combustion of fuel in internal combustion engines. Some fuels more rapidly oxidize and burn more readily than others depending upon the quality and quantity of the volatile constituents in the fuel. In order to obtain a highly efficient fuel having a high degree of combustion, materials are added having anti-knock properties. Among the best known and most commonly used anti-knock agents, tetra ethyl lead stands foremost. The disadvantage, however, of using this material is its highly poisonous property. Care must be taken to avoid any contact with or inhalation in the human body.

Furthermore, the octane rating is an important index of the anti-knock characteristics of the gasoline used as a motor fuel.

It is an object of this invention to produce compounds highly adaptable for use in connection with motor fuels, and in a relatively efficient and economic manner.

Another object of the invention is to form anti-knock compounds capable of producing a high octane rating in the fuel with which they are mixed.

One other object of the present invention is to subject nickel carbonyl to a catalytic action to obtain new compounds of double molecular weight as compared with the original starting compound.

With the above and other objects in view, my invention generally includes the treatment of nickel carbonyl by a catalytic action in the presence of various light rays to obtain compounds having twice the molecular weight of the original starting compound and which produces anti-knock characteristics in a motor fuel when added thereto in small quantities.

In the accompanying drawing is shown a flow diagram illustrating the various steps of the method hereinafter described more in detail.

Referring to the illustrated, accompanying diagram, and as an example of application of this invention, I use nickel carbonyl Ni(CO)₄ which has a specific gravity of about 1.318 and is a colorless volatile liquid. This nickel carbonyl, having a boiling point of about 112° F. and which decomposes at about 150° to 180° F., is forced by means of a pressure pump 10 through a conduit line 11 into a pipe still 12 to vaporize the same. The nickel carbonyl is then passed into the lower end of a reaction tower 13, in a highly vaporized and diffused state. The tower 13 may be of quartz glass or may be of any other suitable material and its top or upper end provided with a quartz window 14 above which is a sun ray machine 15 and the like to give off rays simulating many of those of ordinary sunlight. Instead of using such machine or artificial means, a portion of the sunlight may be used to provide the necessary quantity and type of rays for acting on the vaporized material in reaction tower 13.

These rays influence the vapor in the tower to increase their molecular concentration and form an entirely new compound having the same empirical formula. In the treatment of the vapors of nickel carbonyl under these conditions there is formed a new compound, namely, di-nickel dicarbonyl, and the reaction may be presented as follows:

$$2\mathrm{Ni(CO)}_4 + \text{actinic rays} = [\mathrm{Ni(CO)}_4]_2.$$

The tower itself may or may not contain catalysts to obtain the most favorable surface contact and to aid the chemical phenomena caused by the rays entering the tower, upon the finely vaporized particles of the nickel carbonyl which apparently becomes ionized.

The vapors nearest the top end of the tower and directly exposed to the action of the rays pass through an outlet conduit at the top of the tower into U conduit 16. It will be noted that this outlet conduit and the U conduit may be considered as an integral pipe line in which there is a collection of the newly formed compound to set up a back pressure and prevent too rapid a flow of the vaporized nickel carbonyl from the reaction tower. The material in U-conduit 16 is led into the top of an absorption tower 17 provided with parallel baffle plates. While the newly formed material is led into the top of the absorption tower, a continuous supply of cold kerosene or other solvent hydrocarbon, such as a motor fuel, is pumped into the top through line 18 by means of a pump 19 whereby the newly formed compound is taken up by the kerosene and drawn off from the lower end of the tower through a conduit 20 leading to a storage tank not shown.

The rate of flow of the newly formed compound into the absorption tower may be varied or regulated to obtain any desired percentage concentration of this compound in the solvent chemical or in the motor fuel; this percentage being advantageously that required to produce a satisfactory octane rating in said motor fuel. If desired the nickel carbonyl can be purified by distillation prior to treatment by my process.

It is to be noted that according to my invention I have produced a new compound from nickel carbonyl, having the chemical formula of $[Ni(CO)_4]_2$ which has a specific gravity of 2.6, a boiling point of 180° F., and decomposes at about 220° F. The vapors of this new substance are absorbable in kerosene or any other hydrocarbon liquid generally used as a fuel in internal combustion and like engines. Also, the new substance may be mixed in any proportion with other substances to produce a vaporizable salt of nickel when the mixture is burned. This resultant mixture or solution may be dissolved in gasoline in various proportions to give the gasoline fuel an increased octane rating depending upon the requirements of various commercial and technical specifications.

In order to indicate more clearly the actinic rays used to act on the vapors of nickel carbonyl, I have named them epsilon rays which have the property of changing the molecular composition of the substance subjected to the action of these rays. The quartz window employed permits the passage of ultra violet light which is probably the effective agent in producing the results described.

It will be noted from the foregoing that the new product which I form according to my invention is termed di-nickel di-carbonyl and has the properties of influencing the octane rating of any fuel used for internal combustion engines.

Various modifications as to form, method and use of materials may be made without departing from the spirit and scope of my invention.

I claim:

1. The method of forming di-nickel di-carbonyl which consists in vaporizing nickel carbonyl, separating impurities therefrom by distillation, subjecting the purified nickel carbonyl to the action of actinic light rays until a compound having a boiling point of 180° F. is formed and finally drawing off the newly formed material.

2. The method of forming an anti-knock motor fuel which consists in cleaning nickel carbonyl, subjecting the cleaned nickel carbonyl to the action of actinic light rays whereby di-nickel di-carbonyl is formed, and finally dissolving the resultant di-carbonyl in gasoline to form an anti-knock motor fuel.

3. The method of forming an anti-knock motor fuel which consists in cleaning nickel carbonyl, subjecting the cleaned nickel carbonyl to the action of actinic light rays whereby di-nickel di-carbonyl is formed, dissolving the resultant di-carbonyl with a chemical solvent to form a solution, and mixing the solution of the di-nickel di-carbonyl in the chemical solvent with a liquid hydrocarbon to form a motor fuel having anti-knock characteristics.

4. The method of forming an anti-knock compound which consists in cleaning nickel carbonyl, having a boiling point of 112° F. subjecting the cleaned nickel carbonyl to the action of actinic light to form di-nickel di-carbonyl having a boiling point of 180° F.

5. Di-nickel di-carbonyl.

6. Di-nickel di-carbonyl having the probable formula of $[Ni(CO)_4]_2$ a boiling point of about 180° F. and a decomposition point of about 220° F.

7. The process which comprises vaporizing nickel carbonyl, subjecting the resulting vapor to the action of actinic light and recovering a reaction product having a specific gravity and boiling point higher than the specific gravity and boiling point of nickel carbonyl.

8. The process of claim 7 wherein the vapor of nickel carbonyl is passed through a catalyst chamber prior to subjection to the actinic light.

9. The process of claim 7 wherein the subjection to actinic light is in the presence of a catalyst.

10. The process which comprises subjecting nickel carbonyl to actinic light rays equivalent to those produced by passing sunlight through a quartz window.

11. A motor fuel having anti-knock characteristics produced by the presence therein of a small percentage of di-nickel di-carbonyl.

12. A motor fuel having anti-knock characteristics produced by the presence therein of a small percentage of a product produced by subjecting nickel carbonyl to the action of actinic light, the said product having a higher boiling point and a higher specific gravity than nickel carbonyl.

13. The process of imparting anti-knock characteristics to a motor fuel which comprises dissolving therein a small proportion of di-nickel di-carbonyl having the probable formula $$[Ni(CO)_4]_2$$

14. The process of imparting anti-knock characteristics to a motor fuel which comprises dissolving therein a small proportion of a product produced by subjecting nickel carbonyl to the action of actinic light, the said product having a higher boiling point and a higher specific gravity than nickel carbonyl.

HUGH GRAHAM WEBSTER.